April 26, 1927. 1,626,497
A. ARCHIPENKO
METHOD OF DECORATING CHANGEABLE DISPLAY APPARATUS
Filed July 22, 1925 6 Sheets-Sheet 1

Inventor
Alexander Archipenko
By Prentiss, Stone & Boyden
Attorneys.

April 26, 1927.

A. ARCHIPENKO 1,626,497

METHOD OF DECORATING CHANGEABLE DISPLAY APPARATUS

Filed July 22, 1925　　6 Sheets-Sheet 2

Inventor
Alexander Archipenko.
By Prentiss, Stone & Boyden
Attorneys

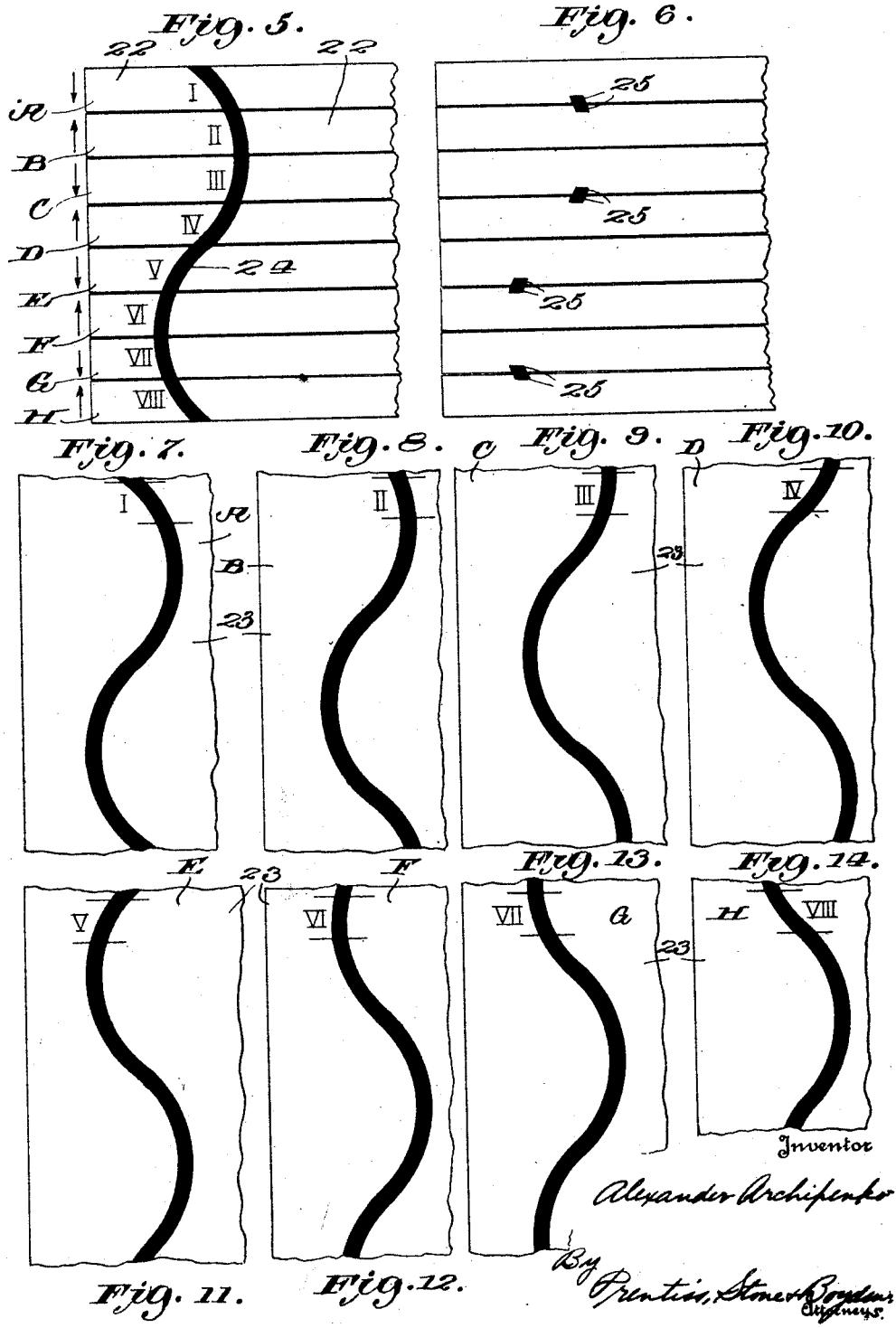

April 26, 1927.  A. ARCHIPENKO  1,626,497
METHOD OF DECORATING CHANGEABLE DISPLAY APPARATUS
Filed July 22, 1925   6 Sheets-Sheet 4
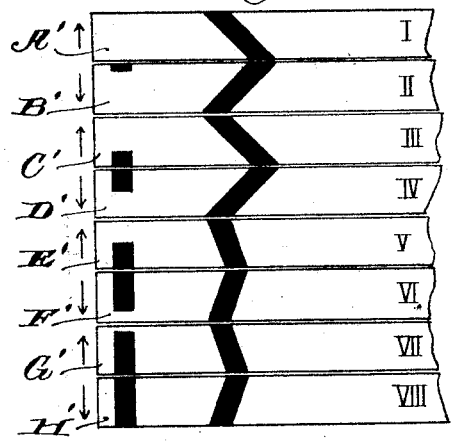
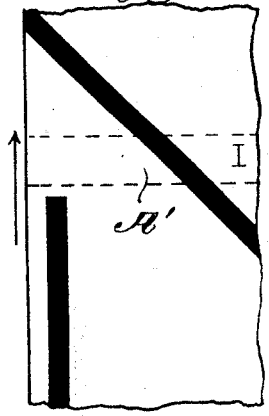 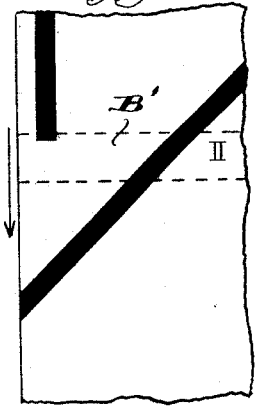 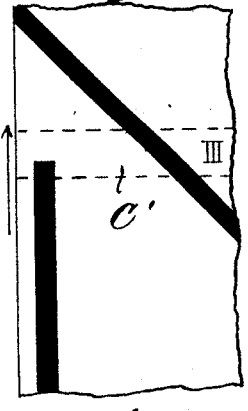 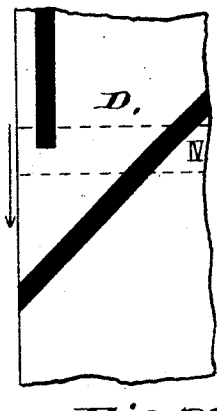
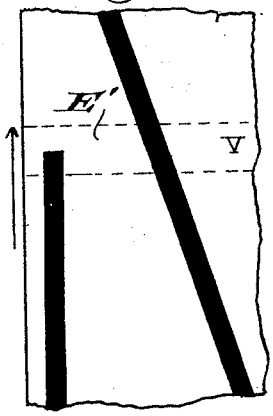 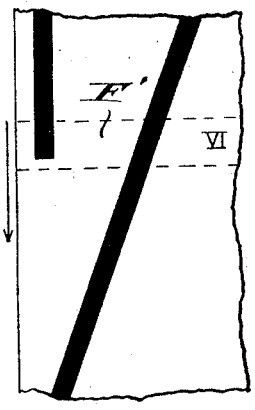 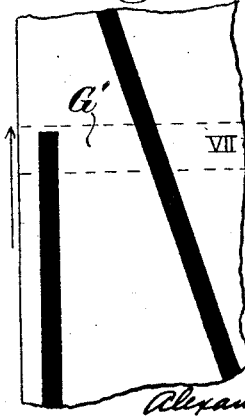 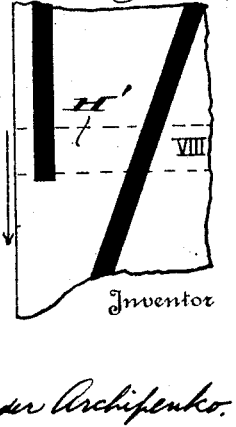
Inventor
Alexander Archipenko.
By Prentiss, Stone & Boyden
Attorneys.

April 26, 1927.

A. ARCHIPENKO 1,626,497

METHOD OF DECORATING CHANGEABLE DISPLAY APPARATUS

Filed July 22, 1925  6 Sheets-Sheet 5

Inventor

Alexander Archipenko.

By Prentiss, Stone & Boyden.
Attorneys.

April 26, 1927.  1,626,497

A. ARCHIPENKO

METHOD OF DECORATING CHANGEABLE DISPLAY APPARATUS

Filed July 22, 1925   6 Sheets-Sheet 6

Inventor

Alexander Archipenko.

By Prentiss, Stone & Boyden
Attorneys

Patented Apr. 26, 1927.

1,626,497

UNITED STATES PATENT OFFICE.

ALEXANDER ARCHIPENKO, OF NEW YORK, N. Y.

METHOD OF DECORATING CHANGEABLE DISPLAY APPARATUS.

Application filed July 22, 1925. Serial No. 45,435.

This invention relates to a new method of preparing changeable pictures and applying illustrations, paintings, and words to the display surface of changeable or animated picture apparatus so as to display motion and dynamic effects on a plane surface.

The invention is designed primarily for displaying a single picture or scene in such a manner as to suggest life and movement, the phases of the picture or scene changing gradually so as to change in color, to merge, fade or develop into one another in a smooth and natural manner. The resultant pictures are peculiar in that one characteristic of them is a tendency to provide an optical illusion effect, possibly due to the fact that the display field does not move as a whole, but in fact the surfaces comprising the field are so small that no movement is noticeable unless the observer is very close to the machine.

The method of decoration requires as a fundamental some apparatus of the type hereinafter particularly described and which may be briefly classed as that in which a surface to be either decorated or displayed is made up of a large number of relatively narrow surfaces, preferably quite flat, and the assembly of the narrow surfaces providing a substantially plane surface. The narrow surfaces are respectively portions of long belts, so mounted as to display only a restricted portion of each at any one time.

Another peculiarity of this structure is that no one belt will receive a picture complete in itself, assuming that a belt might be withdrawn from the machine and displayed in its extended form. This latter peculiarity is quite largely due to the fact that the present method uses abstract lines and forms placed in certain order, which provide an intelligible, complete, and continuously changeable picture only when arranged in the required sequence or order of the assembly. This is in contrast to previous forms in which fragments of the complete picture on any one band have been optically and photographically exactly the same as the parts represented.
With the process of decoration of the present invention, it is possible to so illustrate the plane surface that the impression of motion is conveyed to the observer. This is most strikingly observed in the run of a continuous transitory type of picture. It is less clearly observed in the intermittent or periodic type.

One of the features of the present method relates to the display of either a static condition or the appearance of transition or motion in a picture which is adapted to be run with continuous movement from beginning to end, as contrasted to an intermittent movement. By this method, one part of a figure may be in repose, and another part may be moving, and in their assembled relation, the bands displaying both repose and motion are all moving at the same rate of speed.

The above and other features and details of the invention will be more particularly described and claimed in the following specification and claims.

One form of apparatus for use in connection with the improvements claimed is illustrated in the accompanying drawing, in which:—

Figure 1 represents the frame enclosing a picture plane consisting of a plurality of movable surfaces formed by aprons or belts, portions of which appear as elements of the picture plane. The picture illustrated in Figure 1 contains portions which are in repose and other portions which are in transition, and according to the particular method of illustrating of the present invention, show lines which indicate motion;

Figures 2, 3 and 4 represent fragmentary portions of the belts or aprons, upon which are painted portions of the scene or picture illustrated in Figure 1, the parts I, II, III of Figures 2, 3 and 4 indicating the same portions I, II, III of Figure 1;

Fig. 5 is a diagrammatic view, showing a picture plane upon which is painted a curved line, illustrating the improved painting method in a simple form;

Fig. 6 is a view similar to Fig. 5, further illustrating the painting method, in which view the exposed surfaces of the belts or aprons have been moved sufficiently from the position shown in Fig. 5 so that only a fragmentary portion of the painted representation remains in view;

Figure 24:
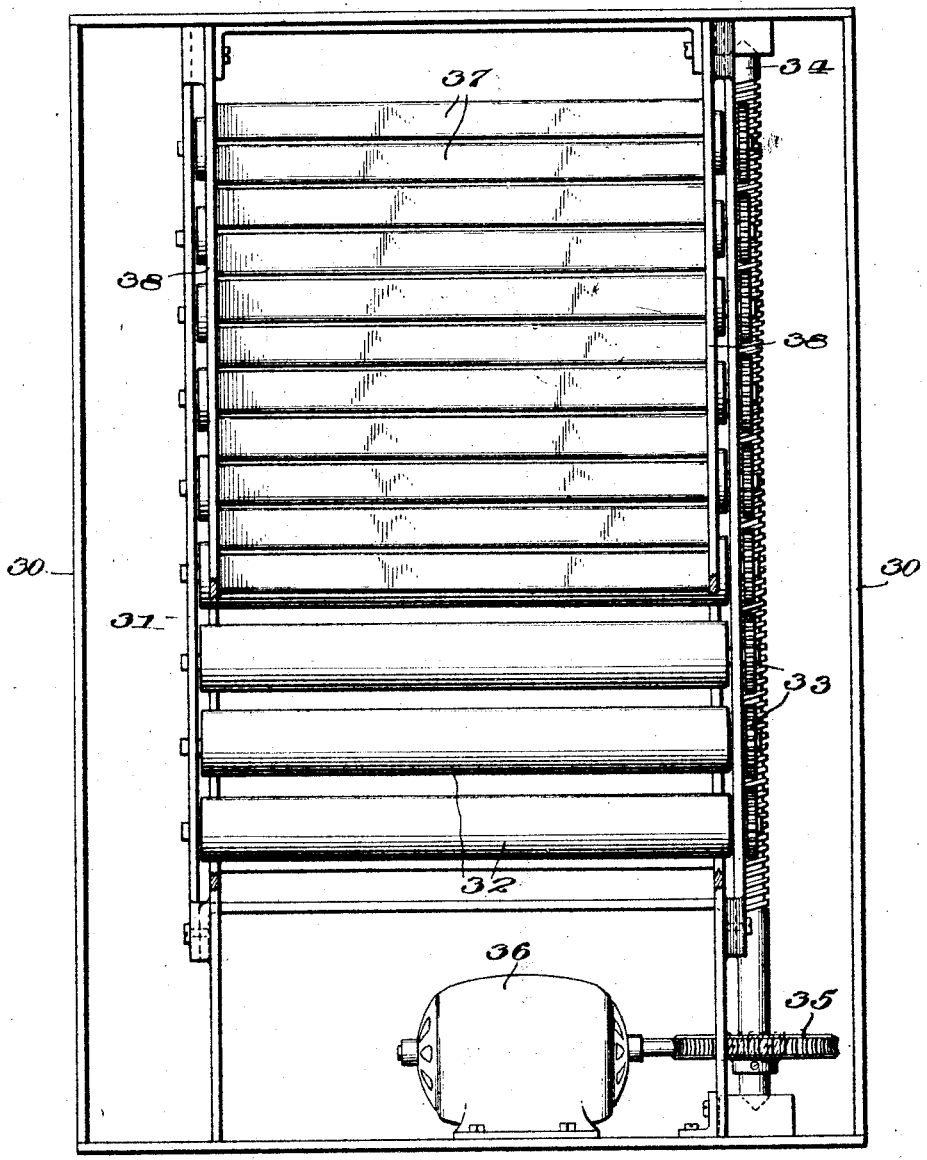
Figure 25:
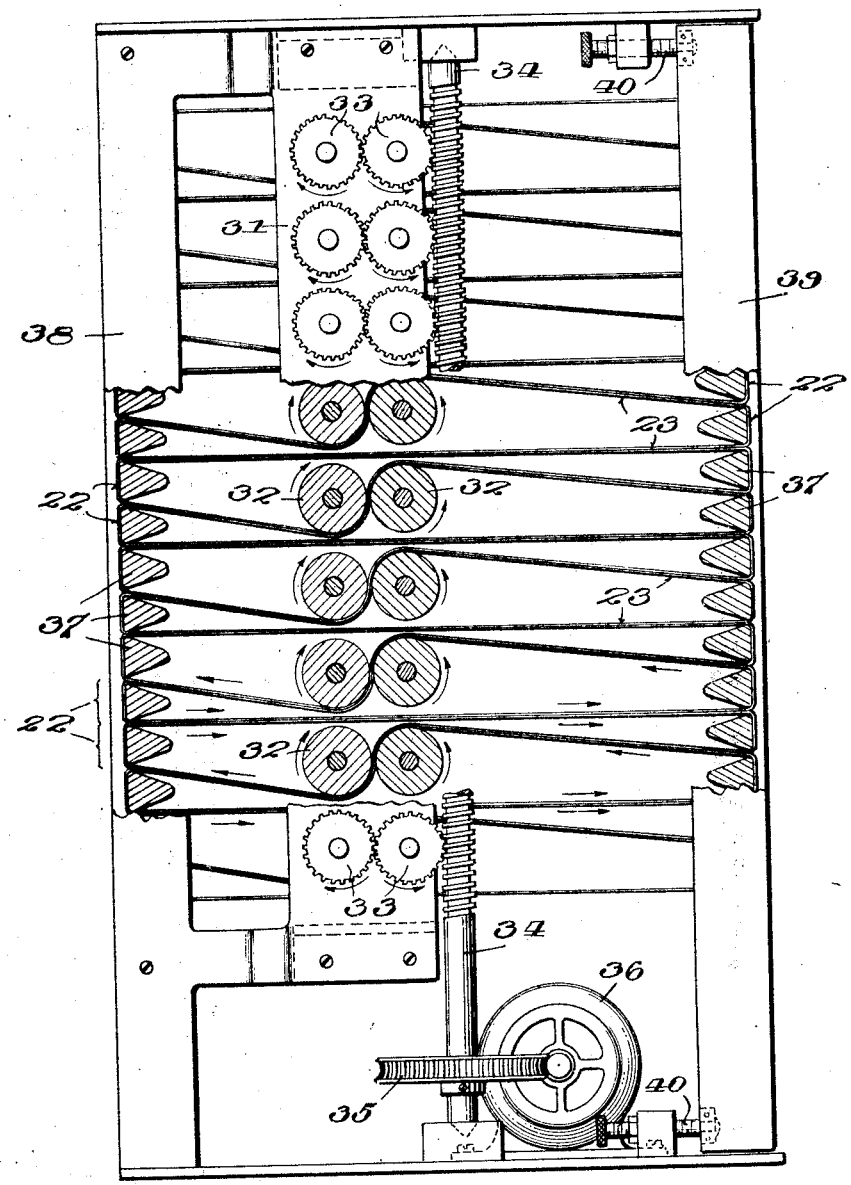

Figs. 7–14, inclusive, represent fragmentary portions of the belts or aprons upon which are painted portions of the illustration of Figure 5, like portions of each belt being marked to indicate that portion of the view of Figure 5 of which each constitutes a part;

Figure 15 is a diagrammatic view, somewhat similar to Figure 5, showing a picture plane on which are painted two lines illustrating the method of the present invention for representing two types of motion, namely, movement in a straight line up and down and movement to the right or left, as shown by the zig-zag line;

Figures 16-23, inclusive, represent fragmentary portions of the belts or aprons upon which are painted portions of the illustrations of Figure 15, like portions of each belt being marked to indicate that portion of Figure 15 of which each represents a part;

Figure 24 is a front view, partly in section and partly in elevation, showing one form of apparatus which may be used in carrying out the improved method;

Figure 25 is a side view of the same machine, shown partly in elevation and partly in section, parts of the frame work being broken away to disclose the interior of the machine.

Figure 1:
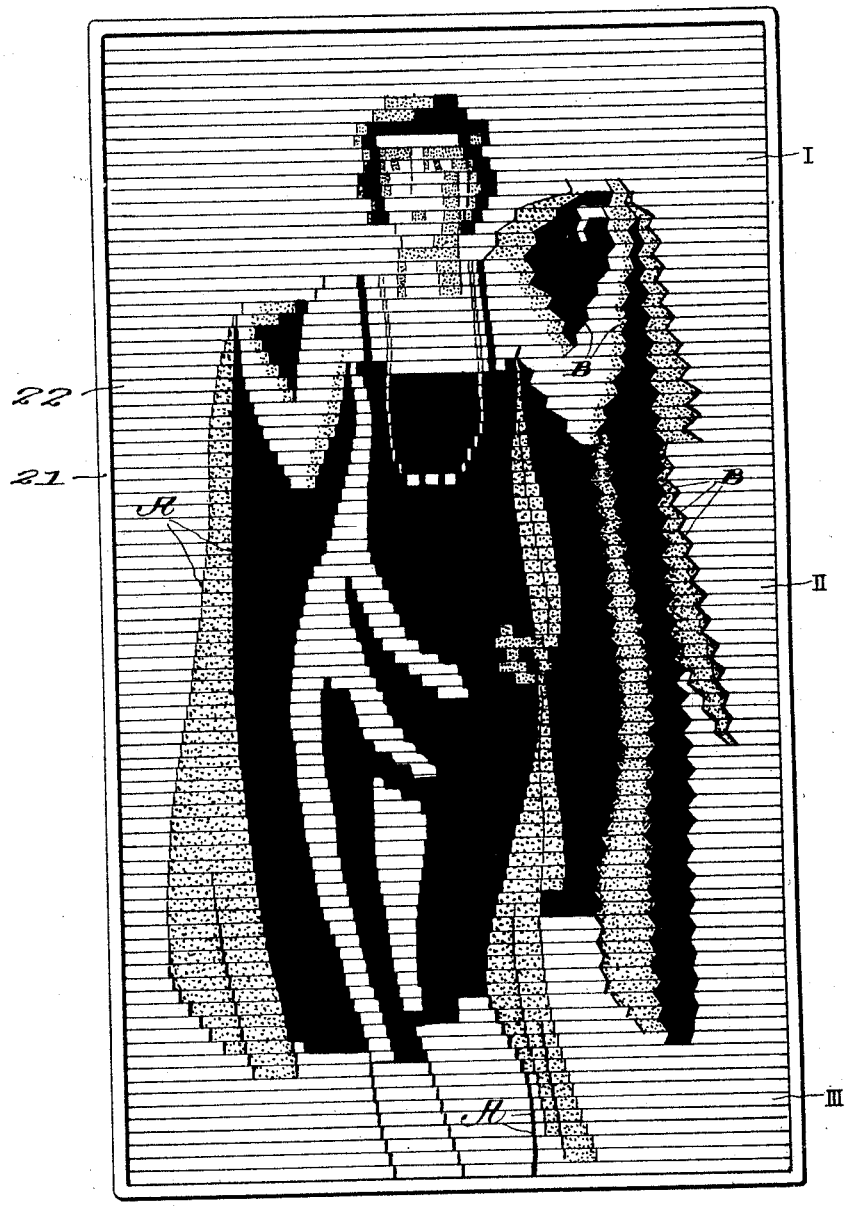

The method requires apparatus including a surface which is to be decorated in accordance with the method. Referring to Figure 1, the reference numeral 21 denotes a suitable frame within which is a plane surface composed of sections 22 of movable belts or aprons 23 (Fig. 25). Upon this surface may be applied by painting or otherwise, any desired picture or illustration, as that of a woman with a cloak, as shown in Figure 1. The picture may be a single object, as shown in Figure 1, or it may be a scene representing a number of different objects or figures.

The manner of progressively operating the belts 23 during the application of the decoration thereto will now be described. Figure 5 is a diagrammatic view of a like plane surface formed of a plurality of sections 22, upon which has been painted a single curved line corresponding to the pictured figure shown in Figure 1. The single curved line has been selected for simplicity of example for description, but it will be understood that the method is the same for all objects.

It will be noted that the adjacent belts or aprons 23 are in close proximity to each other so that their exposed sections 22 present a substantially continuous picture-plane. The belts are adapted to be simultaneously moved and all at the same rate, a suitable mechanism for accomplishing this result being hereinafter described. As indicated by the arrows in Figure 5, adjacent sections of the belts or aprons on the picture-plane move toward or away from each other, alternate sections moving in the same directions. From this it will be evident that these portions of adjacent belts which lie back of the picture plane, and which move in close proximity to each other, will advance in the same direction and at the same rate of speed when the belts are shifted. This is necessary in order that the fragmentary picture portions appearing on the belts shall not be rubbed or in any way marred by frictional contact between two belts, as would result if two adjacent belts were moved in different directions or at different speeds.

Any figure or transitory stage of the illustration, as the curve 24, having been applied to the picture plane, the belts or aprons are then shifted such a distance that only small end portions, as 25, of the curve 24 remain visible upon the new picture plane. Continuing from these fragmentary portions or dots 25, the artist completes an additional and transitory stage of the illustration. The second stage having been completed, the belts are again moved so as to leave fragmentary portions only of the figure, from which fragmentary portions another figure is completed. This procedure may be continued until the entire or any desired length of the belts has been decorated. By now moving the completely decorated belts at a continuous rate the appearance of life or animation is imparted to the figures appearing upon the picture plane. For example, the curve 24 shown in Fig. 5 may be caused to writhe with a sinuous movement similar to that of a serpent. Likewise, by skillful decorating of the aprons, the pictured representation of a woman shown in Fig. 1 may be caused to move, or to perform any series of movements, such as removing her cloak, when the aprons are moved in one direction. By then operating the apron in the reverse direction, the act is reversed and the figure is shown replacing the cloak. Other effects may be produced in a similar manner, as will be described.

The curves illustrated in Figs. 7-14, inclusive, represent the fragmentary portions of the complete picture which appear upon each apron or belt, as spread out back of the picture plane. For example, Fig. 7 shows the curve which will be drawn upon the uppermost belt of the series, designated by A. The entire curve shown in Fig. 7 will at no one time be visible upon the picture plane, but only the small section of the curve, as illustrated in Fig. 5. Likewise, the curves shown on belts B, C, D, E, F, G and H never appear in their entirety upon the picture plane, but only small sections of each, which sections taken together make up the continuous curve shown at 24 in Fig. 5.

Figure 2:
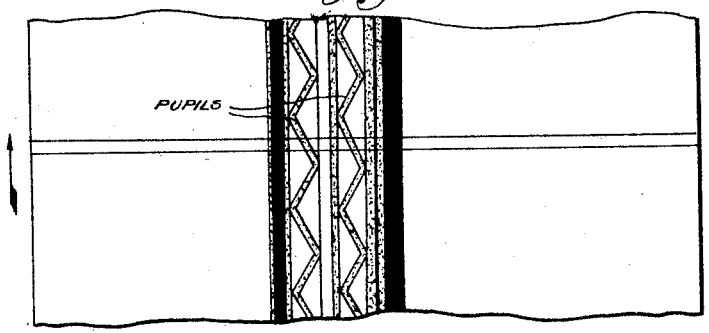

The method of illustrating the motion will now be described. Referring particularly to Figure 1, it will be observed that the woman is holding her cloak in her two hands in the act of either placing it on or removing it from her shoulders. At the left of the picture, the cloak hangs relatively quietly from her right hand, and this motionless portion is outlined with substantially straight vertical lines on each horizontal strip portion 22 of the belts. Decided motion is indicated with the woman's left hand and in the portion of the cloak hanging therefrom. Motion sidewise, as the cloak is swung around by the woman's arm, is indicated by the zig-zag appearance of the contour lines of that portion of the cloak. During this act of moving the cloak, the woman is standing relatively still, and her head is motionless, as indicated by the vertical lines denoting the outline of the leg and head. In Figure 1, repose and absence of motion is indicated at portions marked A, and motion is indicated at portions marked B. In Figure 2, it will be observed that the motionless period of the head extends over a duration of several widths 22 of which the part I is but one. The same applies to Figure 4, and the legs. However, in Figure 3, for the part II, the diagonal direction of the margin on the right hand indicates motion, and lasts over a period of several widths of display surface 22 of that particular belt.

The contour lines indicate either rest or motion. Horizontal movement to the left or right is indicated by the successive appearance of parts of diagonal lines on adjacent belts. Motion, as indicated by the diagonal lines, is an important feature of the present invention. Continuous movement in the picture, as contrasted to intermittent or step by step display, is possible only by the arrangement of lines displayed in Figure 1. This system of illustration will now be analyzed in connection with Figures 15–23, inclusive, in which Figure 15 represents a portion of eight widths of surface 22, similar to the view of Figure 5, and Figures 16–23, inclusive, represent the eight bands removed and stretched out. On the surface of Figure 15, it is proposed to show at the left a straight line moving upward, and on the right a moving zig-zag line, which latter may be the margin of the cloak shown in Figure 1. Figures 16–23, inclusive, represent fragmentary portions of the vertical and zig-zag lines shown in Figure 15. When the belts move in the direction indicated by the arrows one end of the vertical line shown in the belt H' will appear on the picture (Figure 15) first. Then immediately a portion of the vertical line will appear on the belt G' and then successively on the belts F', E', D', C' and B'.

In Figure 15, the vertical line is not in evidence on the belt A', but should this belt be moved further a one-fourth of the display width then the vertical line would appear also on the belt A'. The portions of the vertical line are placed on the bands in such an order that when a beginning of it appears on the next following band, then the line grows longer on the next preceding one, and thus the impression of movement is conveyed. The movement is upwards or downwards depending on the direction of the movement of the belts. The line will appear and seem to move upward if the belts are moved in the direction of the arrows, and will disappear downwardly if the belts are moved in a direction reverse to that indicated. The zig-zag line will move to the right as the belts are moved in the direction of the arrows, and such is the movement shown in Figure 1, as the woman swings her cloak around to the right. Reverse movement of the belts would cause the zig-zag contour line to move to the left. In Figure 1, the pupils of the woman's eyes are intended to move periodically to the right and left, and accordingly on the belt which includes the pupil portion, marked I, the woman's eyes are shown in slanting dotted lines, and in Figure 2, they are represented in the zig-zag manner shown and thus corresponding to the periodic right and left movement.

Speed of movement to the right or left and up or down, apart from the speed of belts, depends on the relative inclination of the slanting lines and on the increased ratio of the vertical lines, which may be displayed on each belt portion 22. A sharply tilted diagonal line, thus inclined away from the line of movement of the belts, will give the impression to the eye of relatively great speed of movement. Thus, that portion of the zig-zag line on Figure 15 on belts E', F', G' and H' will convey the impression to the eye of movement at a rate of speed slower than that of the same line on the belts A', B', C', D', by reason of the less inclination of the former. The views of the zig-zag line shown on belts C', D', E', F', G', H', never appear in their entirety upon the picture plane, but only small sections of each which, in their assembled relation, compose the view shown in Figure 15.

Figure 3:
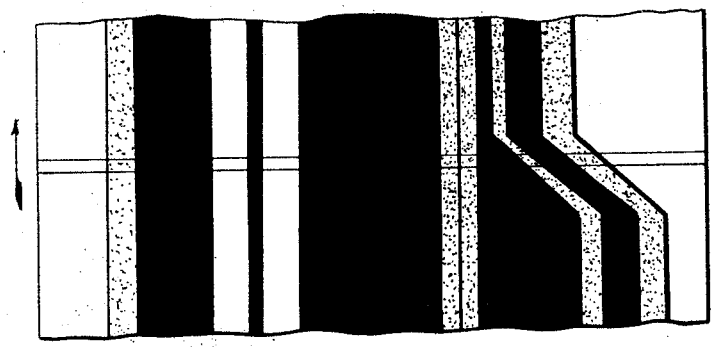
Figure 4:
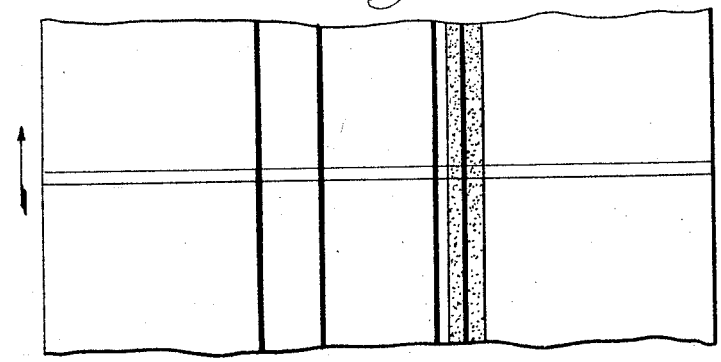

Similarly, Figures 2, 3 and 4 show the appearance of the component belts or aprons used for illustrating the figure of a woman of Figure 1. In Figure 2, the belt represented at I in Figure 1 has been selected and the belt is shown stretched out and the space I between the dotted lines in Figure 2 corresponds with that portion of the belt which appears upon the picture plane in Figure 1. This corresponds to a horizontal view on the level with the eyes of the figure of the woman. Likewise, in Figures 3 and 4, belts II and III are illustrated, the body and cloak being shown in II and the legs in III, between the dotted line portion. It may be observed from Figures 2, 3 and 4 that the individual belts, when stretched out, show nothing, which, considered alone, is recognizable as a part of the complete picture. This is one of the peculiarities of the present invention.

It will be evident that other forms of apparatus may be employed for carrying the improved method into effect, and the apparatus described hereinafter is only one of several forms which may be employed, but is one which is simple and quite satisfactory to demonstrate the process.

Referring now to Figures 24 and 25, the numeral 30 denotes the outer frame of the machine, having a pair of upright members 31 within which are journaled a plurality of pairs of rollers 32 arranged in vertical series, the rollers of each pair being spaced apart just sufficiently to enable a pair of belts or aprons 23 to pass between them. The rollers 32 are provided at one end with gears 33, the two gears of each pair of rollers meshing with each other, and one gear of each pair engaging in a continuous vertical worm 34, the shaft of which is journaled at top and bottom in the frame of the machine. Secured to the worm shaft is a driving gear 35, operated by a suitable motor or other source of power 36.

Referring to Figure 25, it will be noted that the rollers 32 are located substantially centrally with respect to the frame of the machine, and that each pair of rollers serves to impart movement to a pair of the belts or aprons 23.

As shown, each belt is continuous, and each passes over blocks 37 at the front and rear of the frame. These blocks are arranged in vertical series, and are supported between pairs of upright frame members 38—38 and 39—39 located, respectively, at the front and rear of the frame of the machine. Preferably the frame members 39—39 are adjustable by means of set-screws 40, whereby the tension of the belts 23 may be regulated. It will be noted that the blocks 37 are substantially V-shaped, their outer surfaces being nearly flat, and located so close together that there is just sufficient space for the belts 23 to pass between them. In this manner substantially continuous picture planes are produced at both the front and rear of the machine.

The operation of the device will be evident from the following description. When the motor 36 is started the worm 34 is rotated, thereby rotating the gears 33 as indicated by the arrows in Fig. 25. It will be noted that the two meshing gears of each pair will rotate in opposite directions, but that all the gears in a single vertical row will rotate in the same direction, this being true also of the rollers 32 which are turned by said gears. The successive belts 23 are designed to move in contact with each other throughout their travel back of the picture planes, the upper surface of the lower belt contacting with the lower surface of the belt next above it. Motion is imparted to successive pairs of belts by the rollers 32 between which they pass, the rollers being preferably coated with rubber to insure frictional contact. Adjacent belts thus move in the same direction and at the same speeds throughout their travel back of the picture planes, but in opposite directions when passing over the front surfaces of strips 37 while on the picture planes. Uniformity of movement is insured by having all the gears 33 of the same size, and each operated from a common source, namely, the worm 34.

This method of decorating lends itself particularly usefully for illustrations of the type characterized as having a mosaic-like appearance, so far as their external painting technique is concerned, and which are painted on the belts as successive straight sided geometric figures.

As a result of this method of applying the decorations, a complete picture is displayed at all times.

Two types of motion may be used in displaying the decorated surface; first, a smooth and continuous motion, which discloses a slow development in the picture, but constantly with a complete picture in view; and second, a regular step by step or periodic motion in accordance with which there should be a conformity between the subject matter, either decoration or text, of the display surface and the intervals produced by the motion of the machine.

Heretofore, changeable picture apparatus has been known in which there were a plurality of belts carrying illustrations and assembled to display an effect on a plane surface made up of a plurality of smaller portions. Also, photographic operations have been conducted with apparatus using a plurality of belts in which the belt material was either a film or other sensitized surface. A step by step movement, such as provided by a Geneva gear or motion picture gearing was necessary in such arrangements in order to take pictures or to reproduce the same, inasmuch as a complete new portion of the sensitized surface must be provided for each picture or else portions of the surface would bear overlapping pictures. Contrasted to such prior inventions, the present invention relates to painted bands or belts and to details of the decorating system as a result of which new effects are produced to the eye when the resultant surface is displayed. Also in contrast to such prior uses, the present adjacent belt structures are in close contact immediately at the plane of the picture and there is no space between the adjacent narrow portions of the bands on the display surface, whereas in prior display apparatus, it has been customary to allow some space between adjacent bands, the need for such space being due possibly to the different directional movements of the belts or bands.

It is particularly to be noted that the bands, when removed from the machine, are not provided with naturalistic portions or sections of the object represented in the assembled view, nor do they show photographically exactly the contours of the object to be represented as visualized by the eye. On the contrary, to the eye a relatively complete view, such as one having normal contours may be shown by the assembly of belts and by the picture exhibited on the picture plane, and a constantly and continuously changing transition takes place while the bands are in movement.

Quickly dried colors are used in decorating the belts, and the colors are thinly spread.

Emphasis is placed on the direction of movement of adjacent portions of each set of two belts. If the belts were photographic films or carried on some type of surface other than painted surfaces, possibly the direction of movement might not be particularly important. However, for painted surfaces of the type produced by the present method, it is necessary that the belt movements be at the same rate of speed and in the same direction for contracting belt portions.

The decorated assembly may be reproduced by removing the bands from the machine and separately photographing or copying each, and then reassembling the photographic or copied reproduction.

The method of this present invention has been performed with and pictures resultant thereof have been displayed on apparatus of the type illustrated in the copending application Serial 34,432, filed June 2, 1925, apparatus for displaying changeable pictures.

I claim:

1. The method of decorating the display bands of a machine for displaying changeable pictures, which method comprises decorating while in the machine both of two adjacent bands on a limited portion of each band, and which portion is to be displayed at any one time, then moving into new decorating position the bands a distance slightly less than said limited portion so as to leave visible an undecorated portion and only a remaining end of said decorated portion, and then decorating that new portion of said adjacent bands by adding to said remaining end.

2. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises decorating while in the machine both of two adjacent bands on a limited portion of each band, and which portion is to be displayed at any one time, then moving into new decorating position the bands a distance slightly less than said limited portion so as to leave visible an undecorated portion and only a remaining end of said decorated portion, and then decorating that new portion of said adjacent bands by adding to said remaining end.

3. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises decorating while in the machine both of two adjacent bands on a limited portion of each band, and which portion is to be displayed at any one time, then moving into new decorating position on the bands a distance slightly less than said limited portion so as to leave visible an undecorated portion and only a remaining end of said decorated portion, and then decorating that new portion of said adjacent bands by adding to said remaining end, the bands in any group of three bands being movable so that every other band moves in the same direction.

4. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises decorating while in the machine each band so that it displays a continuous series of connected portions of the illustration to be shown at that narrow portion of the assembly.

5. The method of decorating the display bands of a machine for displaying changeable pictures in which there are a plurality of movable bands having a narrow portion of each adapted to be visible in a given plane, which method comprises decorating while in the machine that portion of all of the bands in the decorating plane which require decoration, then moving alternate bands in the same direction and at the same rate of speed a distance less than the width of the narrow display portion already decorated, then applying further decoration by continuing it from the previously applied decoration yet visible.

6. The method of decorating the display bands of a machine for displaying changeable pictures in which there are a plurality of movable bands having a narrow portion of each adapted to be visible in a given plane, which method comprises decorating while in the machine that portion of all of the bands in the decorating plane which require decoration, then moving alternate bands in the same direction and at the same rate of speed a distance less than the width of the narrow display portion already decorated, then applying further decoration by continuing it from the previously applied decoration yet visible, said further decoration being added in a direction opposite to the path of travel of the respective bands.

7. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises decorating while in the machine both of two adjacent bands on a limited portion of each band, and which portion is to be displayed at any one time, then moving into new decorating position the bands a distance slightly less than said limited portion so as to leave visible an undecorated portion and only a remaining end of said decorated portion, and then using said remaining end of said decorated portion as an index for the addition of new decoration.

8. The method of decorating changeable pictures which comprises decorating a plane surface composed of a plurality of narrow assembled surfaces by intimately and successively applying decoration to said narrow surfaces over a portion thereof less than the width of the surface, and then moving the material of said surfaces to provide undecorated portions for the reception of the continuation of the decoration.

9. The method of decorating changeable pictures which comprises decorating a plane surface composed of a plurality of narrow assembled surfaces by intimately and successively applying decoration to said narrow surfaces, and then moving the material of said surfaces to provide undecorated portions for the reception of the continuation of the decoration.

10. The method of decorating changeable pictures which comprises decorating a plane surface composed of a plurality of narrow assembled surfaces which method comprises applying on the display surface a decoration having abstract lines and forms not photographically a portion of the ultimate object and which in their assembled relation and in motion lend the effect of a concrete shape, as visualized by the eye.

11. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises applying on the display surface formed of a plurality of band sections, a decoration having abstract lines and forms not photographically a portion of the ultimate object and which in their assembled relation and in motion lend the effect of a concrete shape as visualized by the eye.

12. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises applying to the display surface and to each of the band sections therein assembled a decorative part of the entire assembled view having straight lines for contour edges, and thus not photographic images of the assembled decoration.

13. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises applying the decorating medium to adjacent bands and providing a marginal edge to the medium inclined at an angle away from the line of movement of the bands, whereby there is displayed an appearance of movement in the illustration in a direction transversely to the movement of the band.

14. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises applying the decorating medium to adjacent bands and providing a marginal edge to the medium on one band portion inclined at an angle away from the line of movement of that band, and on the next adjacent band inclined in a direction away from the line of movement of the bands and on the side of said line of movement opposite to said first inclined line, said lines joining and apparently merging at their points of juncture, whereby there is provided an appearance of movement in the illustration in a direction transversely to the movement of the bands.

15. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises applying the decorating medium to adjacent bands and providing a marginal edge to the medium on one band portion inclined at an angle away from the line of movement of that band, and on the next adjacent band inclined in a direction away from the line of movement of the bands and on the side of said line of movement opposite to said first inclined line, said lines extending in such directions that they engage each other at the contact points of adjacent belts, whereby there is displayed an appearance of movement in the illustration in a direction transversely to the movement of the band.

16. The method of decorating the adjacent display bands of a machine for illustrating changeable pictures and which includes a plurality of movable bands having a narrow portion of each adapted to be visible in a given plane and so close together as to appear substantially like a relatively large unitary display surface, which method comprises applying the decorating medium and using straight contour lines across the display distance of each display band so decorated.

17. The method of preparing changeable pictures for display purposes which method comprises assembling a plurality of movable bands so that a narrow section of each band is positioned along side of a corresponding section of a next adjacent similar band and the total assembly of narrow sections constitutes a substantially flat plane surface, applying the decorating medium to adjacent bands and using as contour margins arbitrary straight line portions inclined away from the line of direction of the band movements whereby there is displayed movement in illustration transversely of the movement of the bands.

In testimony whereof I affix my signature.

ALEXANDER ARCHIPENKO.